(12) United States Patent
Menon et al.

(10) Patent No.: US 11,384,321 B2
(45) Date of Patent: Jul. 12, 2022

(54) HEADLIGHT LENS CLEANING AND RESTORING COMPOSITIONS AND METHODS OF USE THEREOF

(71) Applicant: Energizer Auto, Inc., St. Louis, MO (US)

(72) Inventors: Rajeev Menon, Dayton, OH (US); Ashot K. Serobian, Dayton, OH (US)

(73) Assignee: ENERGIZER AUTO, INC., St. Louis, MO (US)

( * ) Notice: Subject to any disclaimer, the term of this patent is extended or adjusted under 35 U.S.C. 154(b) by 0 days.

(21) Appl. No.: 16/491,453

(22) PCT Filed: Mar. 5, 2018

(86) PCT No.: PCT/US2018/020886
§ 371 (c)(1),
(2) Date: Sep. 5, 2019

(87) PCT Pub. No.: WO2018/165007
PCT Pub. Date: Sep. 13, 2018

(65) Prior Publication Data
US 2020/0032176 A1 Jan. 30, 2020

Related U.S. Application Data

(60) Provisional application No. 62/577,899, filed on Oct. 27, 2017, provisional application No. 62/467,568, filed on Mar. 6, 2017.

(51) Int. Cl.
| | | |
|---|---|---|
| C11D 11/00 | (2006.01) | |
| C09D 7/20 | (2018.01) | |
| B08B 1/00 | (2006.01) | |
| B60S 3/04 | (2006.01) | |
| C09D 183/06 | (2006.01) | |
| C11D 7/50 | (2006.01) | |
| C11D 17/04 | (2006.01) | |

(52) U.S. Cl.
CPC .......... *C11D 11/0035* (2013.01); *B08B 1/006* (2013.01); *B60S 3/045* (2013.01); *C09D 7/20* (2018.01); *C09D 183/06* (2013.01); *C11D 7/5022* (2013.01); *C11D 7/5027* (2013.01); *C11D 17/049* (2013.01)

(58) Field of Classification Search
CPC . C11D 11/0035; C11D 7/5027; C11D 7/5022; C11D 7/049; B05D 1/28; B05D 1/36; B05D 1/38; B05D 2201/02; B05D 2451/00; B05D 2518/10; B05D 2518/12; B05D 3/007; B05D 3/12; B05D 7/24; B05D 7/52; B05D 7/54; C09D 7/20; C09D 183/06; B08B 1/006; B60S 3/045
See application file for complete search history.

(56) References Cited

U.S. PATENT DOCUMENTS

| | | | | |
|---|---|---|---|---|
| 2,662,837 | A * | 12/1953 | Dunean | C08G 77/32 134/29 |
| 2,897,104 | A * | 7/1959 | Duncan | C09D 9/00 134/29 |
| 4,396,644 | A * | 8/1983 | Taniyama | B05D 7/02 427/160 |
| 6,086,797 | A | 7/2000 | Bango, Jr. | |
| 6,368,526 | B1 | 4/2002 | Bango, Jr. | |
| 6,831,049 | B1 * | 12/2004 | Torres Moreno | C11D 1/523 206/524.1 |
| 6,984,612 | B2 * | 1/2006 | Maillie | C11D 3/0078 134/40 |
| 7,045,001 | B1 | 5/2006 | Kropp et al. | |
| 7,163,446 | B1 * | 1/2007 | Cole | B24B 13/00 451/41 |

(Continued)

FOREIGN PATENT DOCUMENTS

| | | | | |
|---|---|---|---|---|
| DE | 4240274 A1 * | 6/1994 | ........... | C08G 77/392 |
| EP | 2364844 A2 * | 9/2011 | ............. | B32B 27/18 |

(Continued)

OTHER PUBLICATIONS

Pyo, S.-H.; Park, J. H.; Chang, T.-S.;Hatti-Kaul, R. Dimethyl Carbonate as a Green Chemical. Current Opinion in Green and Sustainable Chemistry 2017, 5, 61-66. (Year: 2017).*

(Continued)

*Primary Examiner* — William P Fletcher, III
(74) *Attorney, Agent, or Firm* — Lee & Hayes, P.C.

(57) ABSTRACT

A polycarbonate headlight lens cleaning and restoring kit has a lens cleaning composition, an applicator wipe; and a lens restoring composition comprising a coating component. The polycarbonate cleaning composition contains only liquid components and is free of water. The cleaning composition has a first solvent that softens a Control Polycarbonate Substrate and has a flash point of from −58 F to 220 F; and a second solvent that does not soften a Control Polycarbonate Substrate. The first solvent and the second solvent are present in an amount effective to substantially remove discoloring contaminants from a polycarbonate headlight lens and the polycarbonate lens, and also in an amount so that, after removal of the discoloring contaminants, the polycarbonate headlight lens can be restored to a clear condition. A method of cleaning and restoring a polycarbonate headlight lens that is at least partially discolored from discoloring contaminants is also provided.

15 Claims, 5 Drawing Sheets

(56) References Cited

U.S. PATENT DOCUMENTS

| | | | |
|---|---|---|---|
| 7,793,786 B2* | 9/2010 | Shadwell | H01Q 1/325 |
| | | | 206/524.1 |
| 8,801,860 B1* | 8/2014 | Wall | C11D 11/0035 |
| | | | 134/26 |
| 2004/0235699 A1 | 11/2004 | Moreno | |
| 2005/0159325 A1* | 7/2005 | Maillie | C11D 3/0078 |
| | | | 510/243 |
| 2006/0201378 A1* | 9/2006 | Kropp | C09G 1/02 |
| | | | 106/3 |
| 2006/0263527 A1* | 11/2006 | Ripley | B05C 17/002 |
| | | | 427/301 |
| 2007/0010413 A1* | 1/2007 | Molnar | C11D 1/04 |
| | | | 510/189 |
| 2007/0133098 A1* | 6/2007 | Young | B08B 17/06 |
| | | | 359/642 |
| 2009/0148606 A1* | 6/2009 | Norville | C09K 3/1463 |
| | | | 427/307 |
| 2009/0176678 A1* | 7/2009 | Zeisbrich | C11D 7/10 |
| | | | 510/243 |
| 2011/0027472 A1* | 2/2011 | Howell | C09J 175/04 |
| | | | 427/162 |
| 2012/0097100 A1* | 4/2012 | Ryan | F21S 45/10 |
| | | | 118/620 |
| 2012/0244786 A1* | 9/2012 | Norville | G02B 1/14 |
| | | | 451/442 |
| 2012/0288623 A1* | 11/2012 | Boler | C09G 1/02 |
| | | | 451/526 |
| 2013/0015160 A1* | 1/2013 | Smith | C08J 7/02 |
| | | | 106/287.24 |
| 2015/0132572 A1* | 5/2015 | Lee | C08J 7/042 |
| | | | 428/336 |
| 2016/0332193 A1* | 11/2016 | Ryan | B05D 3/067 |
| 2018/0134915 A1* | 5/2018 | Phang | B60S 3/047 |

FOREIGN PATENT DOCUMENTS

| | | | | |
|---|---|---|---|---|
| JP | H1121510 A | * | 1/1999 | |
| KR | 100840509 B1 | * | 6/2008 | |
| KR | 2012066707 A | | 6/2012 | |
| WO | WO-2004044265 A2 | * | 5/2004 | ........... C09D 11/101 |
| WO | WO-2015118995 A1 | * | 8/2015 | .............. C08L 83/04 |

OTHER PUBLICATIONS

Polymer Science Dictionary; Alger, M., Ed.; Springer Science+Business Media: Dordrecht, 2017; pp. 788 & 830. (Year: 2017).*
International Search Report for International Application No. PCT/US2018/020886, dated Jun. 25, 2018 (3 pages).
Dornath, "Analysis of Chemical Leaching from Common Consumer Plastic Bottles Under High Stress Conditions", Thesis for Honors Project, Commencement Jun. 2010, (54 pages).
Diepens, "Photodegradation and Stability of Bisphenol A Polycarbonate in Weathering Conditions", May 13, 2009, (134 pages).

* cited by examiner

HEADLIGHT LENS CLEANING AND RESTORING COMPOSITIONS AND METHODS OF USE THEREOF

CROSS-REFERENCE TO RELATED APPLICATIONS

This application claims priority to International Application No. PCT/US2018/020886, filed Mar. 5, 2018 and titled "HEADLIGHT LENS CLEANING AND RESTORING COMPOSITIONS AND METHODS OF USE THEREOF," which in turn claims priority from a Provisional Application having Ser. No. 62/577,899, filed Oct. 27, 2017, and Provisional Application having Ser. No. 62/467,568, filed Mar. 6, 2017, titled "HEADLIGHT LENS CLEANING AND RESTORING COMPOSITIONS AND METHODS OF USE THEREOF," all of which are incorporated herein by reference in their entireties.

BACKGROUND OF THE DISCLOSURE

1. Field of the Disclosure

This disclosure relates to compositions that effectively clean and restore polycarbonate headlight lenses, polycarbonate headlight lens cleaning and restoring kits, and methods of cleaning and restoring polycarbonate headlight lenses.

2. Discussion of the Background Art

Polycarbonates are durable compounds. They have high impact resistance, can hold up to extreme temperature, are inexpensive, light weight, are highly transparent to visible light, and thus they are highly preferred as automobile headlights. Automobile headlights (polycarbonate based) are external fixtures which are susceptible to environmental damages. The hard plastic surface which is covered with a clear coat to protect the porous surface can be subject to road salt, motor vehicle exhaust, grime and pollution which ultimately leads to the clear coat fading away.

Clear coats on the headlights can also be affected by different types of cleaning agents used on automobiles. Once the clear coat fades off, the polycarbonate surface becomes susceptible to ultra violet (UV) radiation which eventually leads to the headlights being oxidized, making them yellow and cloudy in appearance. When the headlights are exposed to UV light, the polycarbonate oxidizes into compounds such as phenols, benzyl alcohol, ketones and other unsaturated compounds.

The yellow color formed after prolonged UV exposure is due to further oxidation of phenolic end groups. As polycarbonates absorb UV radiation, the absorbed energy can cause cleavage of the covalent bonds in them, which initiates the Photo-Fries process, leading to photo aging and degradation of the polycarbonates. Oxidation of the headlights leads to the beam of light coming from the internal bulbs to be diffused which leads to weaker light and reduced area of coverage.

Being extremely tough and resilient to impact, in recent years, manufacturers have been building polycarbonate lenses that are thin and lightweight. Due to the thinning of the polycarbonate lenses used for automobiles, the ability to resist expansion under heated conditions which leads to a phenomenon called crazing is lost.

Under certain climatic conditions, the surface temperatures of headlights during daytime can increase to the point where the surface of the lens serves as an evaporative surface for water and humidity in the air. This leads to contaminants including hydrocarbons, road salts, and other microscopic particulates to accumulate on the opened crazed lens surface. These contaminants, even though not visible to naked eye initially, will gradually accumulate to larger deposits and completely damage the surface of the polycarbonate lens.

A current method existing in the market for cleaning and restoring headlights typically involves four to five steps which includes initial cleaning to remove road grime stuck on the headlight, wet sanding with one or two different grit levels of sandpaper, followed by polishing with another higher level grit size, and finally wiping the surface with another wipe (which is preloaded with another chemical composition) or application of clear coat.

Of course, another method is simply to replace the vehicle headlight. This is not an optimal solution due to the high cost of new headlights, or even of used headlights in the event they are available.

SUMMARY OF THE DISCLOSURE

A polycarbonate headlight lens cleaning and restoring kit comprises a) a polycarbonate headlight lens cleaning composition that, b) an applicator wipe; and c) a polycarbonate headlight lens restoring composition comprising a coating component.

The polycarbonate headlight lens cleaning composition contains only liquid components, and comprises i) a first solvent that softens a Control Polycarbonate Substrate, the first solvent having a flash point of from −58° F. to 220° F., and ii) a second solvent that does not soften a Control Polycarbonate Substrate, the second solvent being miscible with the first solvent in the ratio of use at a temperature of 25° C. at 1 atm. The polycarbonate headlight lens cleaning composition is substantially free of water. The first solvent and the second solvent are present in an amount effective to substantially remove discoloring contaminants from a polycarbonate headlight lens and the polycarbonate lens, and the first solvent and the second solvent are present in an amount so that, after removal of the discoloring contaminants, the polycarbonate headlight lens can be restored to a clear condition.

A method of cleaning and restoring a polycarbonate headlight lens that is at least partially discolored from discoloring contaminants is also provided. The method comprises i) providing a polycarbonate headlight lens cleaning composition comprising i) a first solvent that softens a Control Polycarbonate Substrate, the first solvent having a flash point of from −58° F. to 220° F., and ii) a second solvent that does not soften a Control Polycarbonate Substrate, the second solvent being miscible with the first solvent in the ratio of use at a temperature of 25° C. at 1 atm. The polycarbonate headlight lens cleaning composition is substantially free of water. The first solvent and the second solvent are present in an amount effective to substantially remove discoloring contaminants from a polycarbonate headlight lens and the polycarbonate lens, and the first solvent and the second solvent are present in an amount so that, after removal of the discoloring contaminants, the polycarbonate headlight lens can be restored to a clear condition.

The polycarbonate headlight lens cleaning composition is rubbed onto a discolored polycarbonate headlight lens surface with an applicator wipe in an amount sufficient to substantially remove discoloring contaminants from the polycarbonate headlight lens surface to provide a cleaned polycarbonate headlight lens.

Then a polycarbonate headlight lens restoring composition comprising a coating component is applied onto the cleaned polycarbonate headlight lens.

The polycarbonate headlight lens cleaning composition contains only liquid components. It has been found that by utilizing a substantially water-free mixture of a first solvent that softens a Control Polycarbonate Substrate and having a defined flash point with a second solvent that does not soften a Control Polycarbonate Substrate, effective removal of discoloring contaminants from the polycarbonate headlight lens surface can be achieved without the need to incorporate abrasive particles. This is advantageous, because abrasive particles may excessively damage surfaces of the polycarbonate headlight lens, and/or may remain on the surface of the polycarbonate headlight lens and detract from the appearance or transparency of the lens.

The present kit facilitates a new method of removing oxidation and contaminants from the lens surface of a vehicle headlight that is easier and less time consuming than the prior art methods. In embodiments, the present method preserves a vehicle headlight lens surface for a greater period of time after the cleaning process has been undertaken. In embodiments, the present method enhances the illumination provided by the headlight for significantly less money than the cost of headlight replacement.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this application, illustrate several aspects of the invention and together with a description of the embodiments serve to explain the principles of the invention. A brief description of the drawings is as follows.

DESCRIPTION OF THE EMBODIMENTS

Figure 1:
FIG. 1 is a photograph of a solvent evaluation on a clear polycarbonate sheet.

As used herein, effective amounts are generally those amounts listed as the ranges or levels of ingredients in the descriptions. Unless otherwise stated, amounts listed in percentage ("%") are in weight percent of the total composition.

For purposes of this disclosure, the surfaces of automobile headlights and other vehicle headlights is meant to be interpreted broadly. Vehicles other than automobiles include, e.g., motorcycles, bicycles and trucks. The headlight surface to be treated is typically oxidized, dirty, and can be cool or hot.

The present disclosure provides compositions that effectively clean and restore a polycarbonate headlight lens in which the polycarbonate headlight lens is at least partially opaque from oxidation contamination. Also, the present disclosure provides a method of cleaning and restoring polycarbonate headlight lenses.

Polycarbonate Headlight Lens Cleaning Composition

As noted above, the polycarbonate headlight lens cleaning composition comprises a first solvent and a second solvent. The first solvent selected from solvents that soften a Control Polycarbonate Substrate and additionally that have a flash point of from −58° F. to 220° F. The ability of a solvent to soften a Control Polycarbonate Substrate is determined by the test methodology described below.

The first solvent is an aggressive solvent relative to polycarbonate, and softens the outer regions of the polycarbonate headlight lens. This permits removal of discoloring contaminants from the polycarbonate. In an aspect, the first solvent has a flashpoint that is selected such that the composition does not reside on the lens for a long time. This reduces the amount of exposure of the polycarbonate lens to the first solvent, in turn reducing the damage to the polycarbonate material so that the lens can be restored to a surface having the desired optical clarity.

In an embodiment, the first solvent has a flash point of from −58° F. to 90° F. When the first solvent has a lower flashpoint, the risk of causing damage to the uncontaminated regions of the polycarbonate lens is reduced. In an embodiment, the first solvent has a flash point of from 90° F. to 220° F. When the first solvent has a mid-range flashpoint, the person carrying out the step of removing discoloring contaminants from the polycarbonate headlight lens surface (hereafter, the "removing step") has a longer working time to remove discoloring contaminants from the polycarbonate headlight lens surface.

In an embodiment of the present method, the working time of the removing step may be adjusted by carrying out this step at a higher or lower temperature of the lens. In an embodiment, the removing step is carried out with the lens being at a temperature of from 60° F. to 100° F. In an embodiment, the removing step is carried with the lens being at a temperature below 60° F., which extends the working time. In an embodiment, the removing step is carried out with the lens being at a temperature above 100° F., which shortens the working time. In an embodiment, the removing step is carried out with the headlights on to increase the temperature of the lens. In an embodiment, the lens is preheated prior to the removing step. In an embodiment, the lens is preheated by a forced air heating device, such as a hair dryer, to increase the temperature of the lens. In an embodiment, the lens is preheated by a radiant heating device to increase the temperature of the lens.

In an embodiment, the first solvent is selected from the group consisting of acrylonitrile; alkyl aldehydes; alkyl actetates; aryl aldehydes; alkyl ethers; alkyl esters; ammonium hydroxide; benzyl alcohol; alkyl phthalates; chloroethane; cycloalkanes; dialkyl carbonates; dichloroethane; 1,4 dioxane; hydrotreated isoparaffins and naphthenics;

hydroxyl alkyl ketones; kerosene; ketones; methylene chloride; nitrobenzene; phenol; tetrahydrofuran; turpentine; xylene; and mixtures thereof.

In an embodiment, the first solvent is selected from the group consisting of acetaldehyde; acetone, benzaldehyde; butyl phthalate, cyclohexane, cyclohexanone, cyclopentanone; diethyl ether; dimethoxymethane; dimethyl carbonate; ethyl acetate; 4-hydroxy-4-methylpentan-2-one; isopropyl acetate; methyl ethyl ketone; methyl isopropyl ketone; propyl acetate; 1,2-xylene; and mixtures thereof. In an embodiment, the first solvent is dimethyl carbonate.

The second solvent does not soften a Control Polycarbonate Substrate, and is miscible with the first solvent in the ratio of use at a temperature of 25° C. at 1 atm. The second solvent suppresses the aggressiveness of the first solvent, to reduce the amount of damage to the polycarbonate material during the removing step so after the removing step, the lens can be restored to a clear condition. In an embodiment, the second solvent has a flash point that is higher than the flash point of the first solvent.

The preferred ratio of first solvent to second solvent is determined based on the degree of aggressiveness of the first solvent to polycarbonate and other properties of the solvents. In an embodiment, the first solvent is present in an amount effective to remove discoloring contaminants from a polycarbonate headlight lens. In an embodiment, the second solvent is present in an amount effective to reduce the speed of dissolving of a Control Polycarbonate Substrate when exposed to the polycarbonate headlight lens cleaning composition so that, after the removing step, the lens can be restored to a surface having a high optical clarity.

In an embodiment, the second solvent is selected from the group consisting of glycol ether, C1-C8 alkyl alcohol, and mixtures thereof. In an embodiment, the second solvent is selected from the group consisting of propylene glycol n-propyl ether, propylene glycol n-butyl ether, diethylene glycol monobutyl ether, and mixtures thereof. In an embodiment, the second solvent is selected from the group consisting of glycol ether solvents comprising an alkylene functionality selected from ethylene, diethylene, triethylene, propylene, dipropylene or tripropylene glycols with methyl, ethyl, propyl, butyl, pentyl or hexyl ether groups, and mixtures thereof. In an embodiment, the second solvent is selected from the group consisting of 2-butoxyethanol, diethylene glycol butyl ether, triethylene glycol methyl ether, propylene glycol methyl ether, dipropylene glycol methyl ether, propylene glycol propyl ether, propylene glycol butyl ether, dipropylene glycol butyl ether, tripropylene glycol butyl ether, or a mixture thereof. In an embodiment, the second solvent is propylene glycol n-propyl ether.

In an embodiment, the first solvent is dimethyl carbonate and the second solvent is selected from propylene glycol n-propyl ether, propylene glycol n-butyl ether, diethylene glycol monobutyl ether, and mixtures thereof.

In an embodiment, the first solvent is present at a level of from about 15% to about 60%, alternatively from about 25% to about 60%, alternatively from about 52% to about 58%, or alternatively from about 54% to about 56% by weight. In an embodiment, the first solvent is present at a level of from about 15% to about 40%, or alternatively from about 25% to about 40% by weight.

In an embodiment, the second solvent is present at a level of from about 30% to about 85%, alternatively from about 30% to about 75%, alternatively from about 30% to about 60%, alternatively from about 42% to about 48%, or alternatively from about 44% to about 46% by weight. In an embodiment, the second solvent is present at a level of from about 45 to about 85 wt %, or alternatively from about 50% to about 80% by weight.

In an embodiment, the cleaning composition comprises from about 20 to about 55 wt % of the first solvent, and from about 80 to about 45 wt % of the second solvent. In an embodiment, the cleaning composition comprises from about 25 to about 50 wt % of the first solvent, and from about 75 to about 50 wt % of the second solvent. In an embodiment, the cleaning composition comprises from about 30 to about 45 wt % of the first solvent, and from about 70 to about 55 wt % of the second solvent.

In an embodiment, the cleaning composition comprises from about 20 to about 55 wt % of dimethyl carbonate, and from about 80 to about 45 wt % of propylene glycol n-propyl ether. In an embodiment, the cleaning composition comprises from about 25 to about 50 wt % of dimethyl carbonate and from about 75 to about 50 wt % of propylene glycol n-propyl ether. In an embodiment, the cleaning composition comprises from about 30 to about 45 wt % of dimethyl carbonate and from about 70 to about 55 wt % of propylene glycol n-propyl ether.

The polycarbonate headlight lens cleaning composition is substantially free of water. It has been found that polycarbonate headlight lens cleaning compositions containing water may lead to incorporation of the water into the lens during the removal step, leading to clouding or other deleterious effects in the lens. For purposes of the present disclosure, a carbonate headlight lens cleaning composition is considered to be substantially free of water if the composition does not contain water as an added ingredient. Carbonate headlight lens cleaning compositions containing trace amounts of water that are carried in as part of intentionally added ingredients, such as in the form of azeotropes or incidental amounts, are considered to be substantially free of water. Likewise, carbonate headlight lens cleaning compositions containing incidental amounts of water absorbed from the atmosphere are considered to be substantially free of water.

Applicator Wipe

The polycarbonate headlight lens cleaning and restoring kit comprises an applicator wipe for rubbing the polycarbonate headlight lens cleaning composition onto a discolored polycarbonate headlight lens surface in an amount sufficient to substantially remove discoloring contaminants from the polycarbonate headlight lens surface. The applicator wipe may be a fabric or sponge material suitable for coating and imparting light contact to the polycarbonate surface to be cleaned. In an embodiment, the applicator wipe is selected from the group consisting of a wipe, woven fabric, non-woven fabric, microfiber fabric, sponge, towelette, pad and/or combination. In an embodiment, the applicator wipe is selected from woven fabric, non-woven fabric or a sponge. In an embodiment, the applicator wipe is selected from woven fabric, non-woven fabric prepared from a natural fabric, such as cotton, or a man-made material, such as rayon, nylon, polyester, and the like. In an embodiment, the applicator wipe is a sponge made from natural or man-made material. In an embodiment, the sponge is further provided with a scrubbing surface, such as a laminated cloth material.

Lens Restoring Composition

The polycarbonate headlight lens cleaning and restoring kit comprises a polycarbonate headlight lens restoring composition comprising a coating component. For purposes of the present disclosure, a coating component is a material that leaves a residue on the surface of the lens to at least partially fill in any surface abnormalities, such as pits, cracks and the like. The polycarbonate headlight lens restoring composition enhances clarity of the lens. In an embodiment, the polycarbonate headlight lens restoring composition substantially increases luster and provides the surface of the lens with a glossy and clear appearance.

In an embodiment, the polycarbonate headlight lens restoring composition comprises a resin or wax. In an embodiment, the polycarbonate headlight lens restoring composition comprises at least one silicone resin. In an embodiment, the polycarbonate headlight lens restoring composition comprises at least one wax component.

In an embodiment, the polycarbonate headlight lens restoring composition comprises a UV absorbing component. For purposes of the present disclosure, a UV absorbing component is a material that absorbs any amount of light in the UV range. Uncoated polycarbonate materials have been found to be sensitive to UV light, and post-cleaning application of a composition that contains a UV absorbing component extends the beneficial effects of cleaning the polycarbonate headlight lens.

In an embodiment, the polycarbonate headlight lens restoring composition comprises at least one silicone resin in an amount from about 5 weight percent to about 25 weight percent of the restoring composition, and a solvent system for the at least one silicone resin. In an embodiment, the polycarbonate headlight lens restoring composition comprises at least one alcohol in an amount from about 30 weight percent to about 60 weight percent of the restoring composition, and at least one glycol ether in an amount from about 30 weight percent to about 60 weight percent of the restoring composition.

In an embodiment, the polycarbonate headlight lens restoring composition comprises a silicone polymer resin (e.g., Dow Corning RSN-0217 flake resin) and two slow evaporating solvents, preferably hexyl alcohol and diethylene glycol monobutyl ether. In an embodiment, the restoration composition preferably includes from about 30 to about 60 wt % of hexyl alcohol, from about 5 to about 20 wt % of silicone resin, and from about 30 to about 60 wt % of diethylene glycol monobutyl ether.

A combination of slower evaporating alcohol and ether can be used in the restoring composition, preferably hexyl alcohol and diethylene glycol monobutyl ether. This composition gives the polymer resin sufficient time to lay on the headlight surface and level evenly while drying. The restoration composition preferably includes from about 30 to about 60 wt % of hexyl alcohol, more preferably from about 48 to about 54 wt % of hexyl alcohol; from about 5 to about 20 wt % of silicone resin, more preferably from about 10 to about 15 wt % of silicone resin; and from about 25 to about 45 wt % of diethylene glycol monobutyl ether, more preferably from about 30 to about 40 wt % of diethylene glycol monobutyl ether.

Illustrative glycol ether solvents useful in the restoring composition of this disclosure include, for example, ethylene, diethylene, triethylene, propylene, dipropylene or tripropylene glycols with methyl, ethyl, propyl, butyl, pentyl or hexyl ether groups, or a mixture thereof. Preferably, the glycol ether may be 2-butoxyethanol, diethylene glycol butyl ether, triethylene glycol methyl ether, propylene glycol methyl ether, dipropylene glycol methyl ether, propylene glycol propyl ether, propylene glycol butyl ether, dipropylene glycol butyl ether, tripropylene glycol butyl ether, or a mixture thereof. A mixture of a glycol ether and ketone may be useful in the restoring composition of this disclosure. A preferred glycol ether solvent useful in the restoring composition of this disclosure is diethylene glycol monobutyl ether.

In suitable embodiments, the glycol ether solvent in the restoring composition is present at a level of from about 30% to about 60%, alternatively from about 25% to about 45%, or alternatively from about 30% to about 40% by weight.

Illustrative alcohol solvents useful in the restoring composition of this disclosure include, for example, monohydric alcohols and polyhydric alcohols, such as for example $C_5$ alkanols and higher alkanols. Alkanols include, but are not limited to the monohydric alcohols including for example methanol, ethanol, n-propanol, isopropanol, butanol, pentanol, and hexanol, and isomers thereof. A preferred alcohol solvent useful in the restoring compositions of this disclosure is hexanol or hexyl alcohol.

In suitable embodiments, the alcohol solvent can be present in the restoring compositions of this disclosure at a level from about 30 to about 60% by weight, preferably from about 45 to about 55% by weight, and more preferably from about 48 to about 54% by weight of the inventive composition.

Illustrative silicone resins useful in the restoring composition of this disclosure include, for example, silicone resins that exhibit good weatherability, good thermal stability, and are colorless. A preferred silicone resin useful in this disclosure is a hydroxyl functional phenyl silicone resin (e.g., Dow Corning RSN-0217 flake resin).

In an embodiment, the silicone resin can be present in the compositions of this disclosure at a level from about 5 to about 20% by weight, preferably from about 7.5 to about 17.5% by weight, and more preferably from about 10 to about 15% by weight of the inventive composition.

Adjuncts

The cleaning and restoring compositions optionally contain one or more of the following adjuncts: fragrances, lubricants, wetting agents, ultraviolet (UV) absorbers, UV scatterers, and their mixtures. Examples of UV effective agents suitable for use include, but are not limited to Tinuvin 123, Tinuvin 292, Tinuvin 384, Tinuvin 171 and Tinuvin 99, all available from the Ciba Chemical Company.

The adjuncts can be present at a level of from about 0.0001% to about 20%, alternatively from about 0.001% to about 10%, or alternatively from about 0.01% to about 5% by weight.

Propellant

It may be desirable to use the compositions of the present disclosure in the form of an aerosol, particularly in a pressurized aerosol container employing a compressed gas or fluid to serve as a propellant system. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Examples include, but are not limited to those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane.

Other common volatile organic compounds, and their derivatives may suitably be employed, including dialkyl ethers, such as dimethyl ether and diethyl ether and the petroleum ethers. Volatile organic compounds may also be suitably employed as propellants, include the alkane series from methane, propane, butane, pentane and hexane and all of their respective isomers, and mixtures thereof, alone and in combinations thereof Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochlorofluoro-carbons (HCFC). Some examples include but are not limited to HFC-125, HFC-134a, HFC-152a, HFC-227ea, HFC-245fa and HCFC-22.

Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa.

When an aerosol formulation is employed, one or more corrosion inhibitors known in the art are included in the formulations to protect metal portions of the pressurized system, including the can, valve, valve spring, nozzle and components of the aerosol package and dispenser assembly.

In suitable embodiments, the propellant comprises 1% by weight to about 90% by weight, or 2% by weight to about 80% by weight, or alternatively 5% by weight to about 70% by weight of the inventive composition.

Preparation of Compositions

In accordance with this disclosure, a process is provided for preparing the cleaning composition and the restoring composition.

The process for preparing the cleaning composition involves mixing: a first solvent that softens a Control Polycarbonate Substrate, the first solvent having a flash point of from −58° F. to 220° F., and a second solvent that does not soften a Control Polycarbonate Substrate, the second solvent being miscible with the first solvent in the ratio of use at a temperature of 25° C. at 1 atm.

The process for preparing the restoring composition involves mixing: a) at least one coating component is a solvent, By way of example, the restoring composition may be prepared by mixing an alcohol solvent (e.g., hexyl alcohol) in an amount from about 30 weight percent to about 60 weight percent of the restoring composition; b) at least one glycol ether (e.g., diethylene glycol monobutyl ether) in an amount from about 30 weight percent to about 60 weight percent of the restoring composition; and c) at least one silicone resin (e.g., Dow Corning RSN-0217 flake resin) in an amount from about 5 weight percent to about 20 weight percent of the restoring composition.

Compositions of the present disclosure are formed without the need of any solubilizing aid, dispersing aid, surfactant, or dispersant. Processing the compositions of the present disclosure can be achieved using conventional low shear and/or high shear mixing techniques know in the art. Processing of the inventive compositions generally does not require the use of high energy mixing techniques, such as high shear mixing, sonication, ultrasonication, heated processing or use of stator/rotor mixers. High shear mixing processes can be employed if desired, but are not required owing to the unique rheological properties of the inventive compositions. The higher shear mixing processes may be employed for purposes of shortening the process time, however, since the additional mixing energy and heat introduced by these energetic processes typically result in faster processing rates, particularly with larger volumes of materials. However, the high shear mixing processes generally require additional energy and more complicated machinery and equipment, both more costly to use and maintain in an industrial or manufacturing environment. In some instances, high shear mixing may have detrimental effects on susceptible components of the compositions, particularly optional adjuncts added to provide additional benefits or functionalities to the finished compositions, and may not be desirable as the sole mixing process. Hence, high shear processes can be used.

Alternatively, lower energy and low shear mixing techniques, such as agitation, paddle, blade, vortex and helical screw mixing are generally found sufficient for processing compositions of the present disclosure. The low shear mixing techniques lend themselves to both batch and dynamic mixing, or continuous and static mixing approaches for commercial scale preparation of the inventive compositions. Generally, an agitator is employed for low shear mixing in batch modes, i.e. processing of compositions in a single tank, typically in larger volume tanks exceeding several hundreds or thousands of gallons in fluid capacity. For low shear mixing in continuous modes, low shear static mixing, employing in-line helical and vortex mixer elements, which produce laminar and turbulent mixing streams, respectively, are generally employed.

The introduction is generally performed using multiple inlets each dispensing a proportioned amount of material at a rate of introduction adjusted to approximate the desired volume percentage or gravimetric weight percentage of each material in the final composition. The introduction can be via multiple inlets directly into the continuous fluid stream, or via one or more inlets following premix or batch premixing of any two or more compatible components. Thus, suitably compatible components may optionally be combined in smaller premixes or batches prior to introduction into the continuous mixer for ease of handling and processing. The introduction can be simultaneous, that is to say all proportioned materials introduced in the same zone of the continuous mixer, preferably before the shear mixer stage of the continuous mixer, or introduced in separate or multiple zones of the continuous mixer, with or without separate or multiple mixing zones between the inlets. Thus, the inventive compositions may be formed using a continuous process configured in any number of equally suitable configurations of component inlet, mixing and flow stages. Generally, the specific configuration is selected to best match available equipment and the desired properties of the final composition in order to achieve the most efficient continuous process.

Batch mode processing can also be suitably employed to prepare the compositions of the current disclosure.

The compositions are sufficiently robust to allow additional further processing and handling typical to a manufacturing or commercial process, such as pumping, fluid transfer, tank charging, batching, dispensing and filling operations generally employed to make, transfer, store and package compositions for distribution and use.

It is to be understood that other mixing processes, and the order in which the mixing steps are conducted, can be varied to some extent, and other processes known in the art employed to prepare the compositions of the present disclosure Method of Using and Application This disclosure is also directed to a method of cleaning and restoring a polycarbonate headlight lens in which the polycarbonate headlight lens being at least partially opaque from oxidation contamination. The method comprises applying an effective amount of a polycarbonate headlight lens cleaning composition comprising a first solvent that softens a Control Polycarbonate Substrate, the first solvent having a flash point of from −58° F. to 220° F., and a second solvent that does not soften a Control Polycarbonate Substrate, the second solvent being miscible with the first solvent in the ratio of use at a temperature of 25° C. at 1 atm, wherein the polycarbonate headlight lens cleaning composition is substantially free of water to a polycarbonate headlight lens surface. The polycarbonate headlight lens cleaning composition is rubbed onto a discolored polycarbonate headlight lens surface with an applicator wipe in an amount sufficient to substantially remove discoloring contaminants from the polycarbonate headlight lens surface to provide a cleaned polycarbonate headlight lens.

The method further comprises applying an effective amount of a polycarbonate headlight lens restoring composition comprising a coating component onto the cleaned polycarbonate headlight lens. In an embodiment, the polycarbonate headlight lens restoring composition is applied in an sufficient to restore the polycarbonate headlight lens surface to a clear condition.

In one embodiment of the method of this disclosure, to remove the oxidation and contaminants, the cleaning composition is loaded onto a pulp based wipe, preferably at 1:2 to 1:6 wipe to formula. The wipe is folded twice or thrice, and the surface of the headlight is wiped back and forth in a desired direction (preferably horizontal) with firm even pressure.

As soon as resistance is felt while application, a cleaner side of the wipe is switched to and wiping continued with firm even pressure back and forth. The process is continued until no more grime or yellowing is seen on the wipe. When the first solvent has relatively fast evaporating solvent, working on smaller sections of the headlight lens with multiple preloaded wipe, while constantly turning over to the cleaner side of the wipe is a preferred desired method of application.

To restore the headlight clear coat and prevent the headlight from further oxidation, the restoring composition is applied onto cotton based wipe, preferably at 1:4 to 1:5 ratio, and the surface of the headlight is gently coated evenly from top to bottom, again working on smaller sections. As the solvents used in the restoring composition are relatively slow in evaporating, it is preferred to allow a drying time of 6 hours after the coating has been applied.

Although spraying the composition onto the wipe is one mode of application, the compositions of this disclosure may be applied to the target surface by a variety of means, including via a wash, dip or immersion process. The compositions may be applied by means of a carrier, including but not limited to, an impregnated wipe, woven fabric, nonwoven fabric, microfiber fabric, pad, foam, sponge, cloth, towel, towelette, tissue or paper towel or similar releasably absorbent carrier and/or combination that enables the inventive composition to be applied by direct physical contact and transferred from the carrier to the target surface, generally during a spreading, padding, rubbing or wiping operation. Combinations of a direct application, like spraying, followed by a spreading, padding, rubbing or wiping operation performed with the aid of a foam, sponge, cloth, towel, tissue or paper towel, squeegee or similar wiping implement is also suitable for applying the compositions of the present disclosure.

In a preferred method for application of the composition of this disclosure, the wipe can be pre-loaded with sufficient amounts of the composition so that the wipe can be used to remove oxidation and grime materials from exterior surfaces of headlights. This facilitates cleaning and removal of oxidation and other contaminant materials from exterior surfaces of their vehicle headlights, and permits easily disposal of the removed materials together with the wipe. The composition can also be provided in containers (such as bottles), wherein the composition can be directly applied to surface by methods of trigger spray or an aerosol can, and wiped away with a wipe as described herein.

In an embodiment, the cleaning composition and the restoring composition are loaded onto wipes for application purposes. In an embodiment, the cleaning composition is applied to the wipe, which is then used to clean the lens. Alternatively, the cleaning composition is applied directly to the polycarbonate lens, and then the wipe is used to clean the lens. Likewise, in an embodiment, the restoring composition is applied to a wipe, which is then used to clean the lens. Alternatively, the restoring composition is applied directly to the polycarbonate lens, and then the wipe is used to restore the lens.

In an embodiment, the method as described herein is carried out without a physically abrasive step for removal of discoloring contaminants from the polycarbonate headlight lens surface. For purposes of the present disclosure, a physically abrasive step is a step comprising physical abrasion by an abrasive device or material, such as sand paper, emery cloth, grinding wheels or like abrasive devices.

Various modifications and variations of this disclosure will be obvious to a worker skilled in the art and it is to be understood that such modifications and variations are to be included within the purview of this application and the spirit and scope of the claims.

EXAMPLES

Test Methodology To Determine Whether A Solvent Softens a Control Polycarbonate Substrate Materials The Control Polycarbonate Substrate is a clear polycarbonate sheet suitable for use as a glass replacement product.

An example of a suitable material is the LEXAN brand product named the LEXAN CLEAR POLYCARBONATE SHEET.

The applicator wipe is a fabric material made of 55% tree pulp and 45% polyester. This applicator wipe is a 5×7 cm sheet that has been folded twice.

Methodology 5 grams of the solvent to be tested are applied to the applicator wipe. The thus loaded applicator wipe is placed on top of the polycarbonate surface with the loaded side down on the polycarbonate surface. 3-4 pounds of force is applied to the applicator wipe using a force pressure gauge with an angled tip at an angle of 30-60 degrees from the surface. The applicator wipe is then moved in a circular motion for 3 seconds. The polycarbonate surface is then evaluated by unmagnified visual inspection. A solvent is defined as one that softens the surface of the Control Polycarbonate Substrate will appear to have a milky, almost opaque slurry that quickly dries to a semi-solid/solid material on the surface, with a portion of the Control Polycarbonate Substrate having been dissolved into the solvent.

Solvent Evaluations

Various solvent compositions were evaluated using the methodology set forth above, with the following results.

FIG. 1 is a photograph of a solvent evaluation of 100% wt. acetone on a clear polycarbonate sheet, wherein the force applied was 3.1 pounds. The surface of the Control Polycarbonate Substrate has a milky, almost opaque appearance, indicating that the solvent softens a Control Polycarbonate Substrate, and therefore is appropriate for use as a "first solvent" as described herein.

Figure 2:
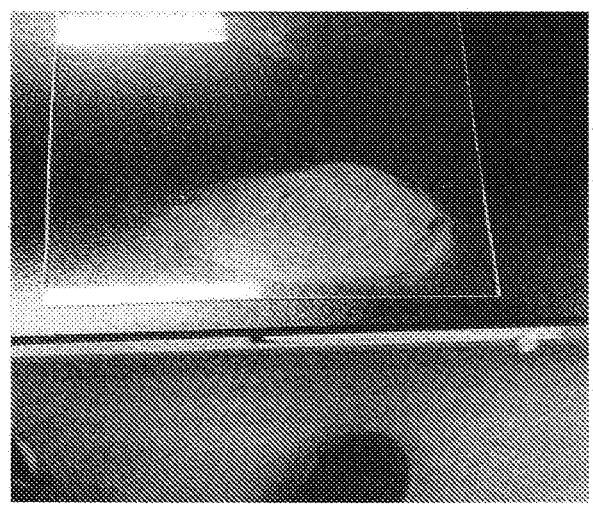
FIG. 2 is a photograph of a solvent evaluation on a clear polycarbonate sheet.

FIG. 2 is a photograph of a solvent evaluation of 100% wt. dimethyl carbonate on a clear polycarbonate sheet, wherein the force applied was 3.3 pounds. The surface of the Control Polycarbonate Substrate has a milky, almost opaque appearance, indicating that the solvent softens a Control Polycarbonate Substrate, and therefore is appropriate for use as a "first solvent" as described herein.

Figure 3:
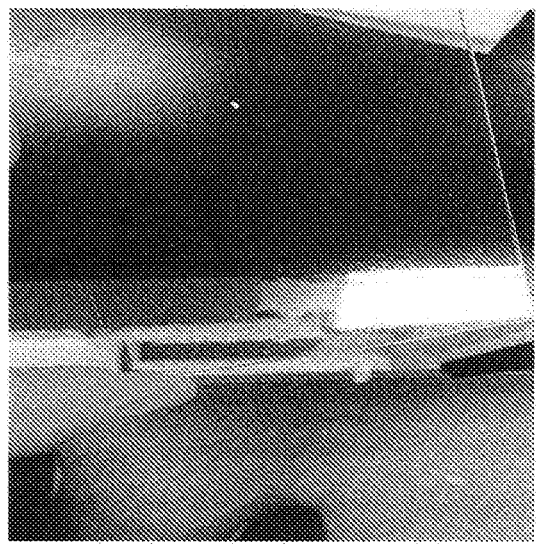
FIG. 3 is a photograph of a solvent evaluation on a clear polycarbonate sheet.

FIG. 3 is a photograph of a solvent evaluation of 100% wt. of LPA® 210 Solvent (a high purity mixture of hydrotreated isoparaffins and naphthenics commercially available from Sasol North America) on a clear polycarbonate sheet, wherein the force applied was 3.3 pounds. The surface of the Control Polycarbonate Substrate has a substantially clear appearance, indicating that the solvent does not soften a Control Polycarbonate Substrate, and therefore is appropriate for use as a "second solvent" as described herein.

Figure 4:
FIG. 4 is a photograph of a solvent evaluation on a clear polycarbonate sheet.

FIG. 4 is a photograph of a solvent evaluation of 100% wt. propylene glycol n-propyl ether on a clear polycarbonate sheet, wherein the force applied was 3.3 pounds. The surface of the Control Polycarbonate Substrate has a substantially clear appearance, indicating that the solvent does not soften a Control Polycarbonate Substrate, and therefore is appropriate for use as a "second solvent" as described herein.

Figure 5:
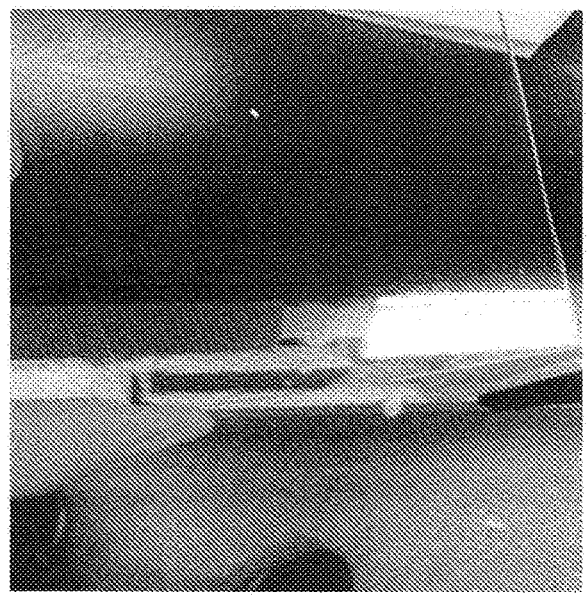
FIG. 5 is a photograph of a solvent evaluation on a clear polycarbonate sheet.

FIG. 5 is a photograph of a solvent evaluation of 100% wt. hexyl alcohol on a clear polycarbonate sheet, wherein the force applied was 3.7 pounds. The surface of the Control Polycarbonate Substrate has a substantially clear appearance, indicating that the solvent does not soften a Control Polycarbonate Substrate, and therefore is appropriate for use as a "second solvent" as described herein.

Figure 6:
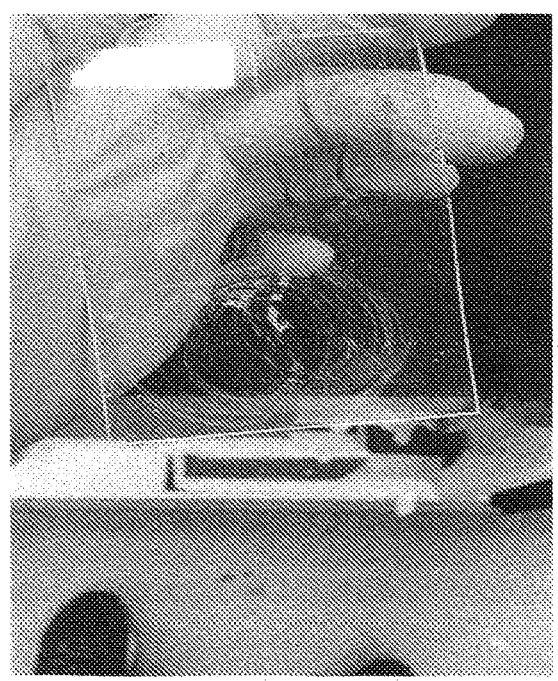
FIG. 6 is a photograph of a solvent evaluation on a clear polycarbonate sheet.

FIG. 6 is a photograph of a solvent evaluation of a mixture of about 37% wt. dimethyl carbonate and about 63% wt. propylene glycol n-propyl ether on a clear polycarbonate sheet, wherein the force applied was 3.3 pounds. Thus, the tested solvent is a mixture of a "first solvent" and a "second solvent" as described herein. The surface of the Control Polycarbonate Substrate has a slightly milky appearance, indicating that the solvent only partially softens a Control Polycarbonate Substrate. The tested solvent mixture would be expected have an appropriate solvating power to substantially remove discoloring contaminants from a polycarbonate headlight lens without causing damage to the uncontaminated regions of the polycarbonate lens. This solvent mixture is therefore is appropriate for use as a polycarbonate headlight lens cleaning composition as described herein.

Figure 7:
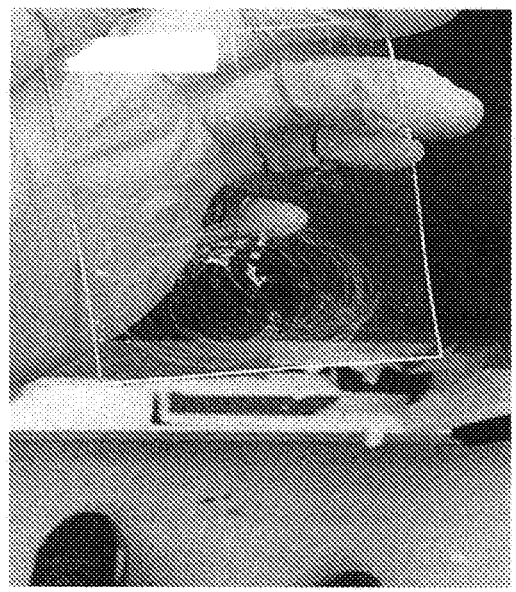
FIG. 7 is a photograph of a solvent evaluation on a clear polycarbonate sheet.

FIG. 7 is a photograph of a solvent evaluation of a mixture of about 56% wt. acetone and about 44% wt. propylene glycol n-propyl ether on a clear polycarbonate sheet, wherein the force applied was 3.3 pounds. Thus, the tested solvent is a mixture of a "first solvent" and a "second solvent" as described herein. The surface of the Control Polycarbonate Substrate has a slightly milky appearance, indicating that the solvent only partially softens a Control Polycarbonate Substrate. The tested solvent mixture would be expected have an appropriate solvating power to substantially remove discoloring contaminants from a polycarbonate headlight lens without causing damage to the uncontaminated regions of the polycarbonate lens. This solvent mixture is therefore is appropriate for use as a polycarbonate headlight lens cleaning composition as described herein.

Figure 8:
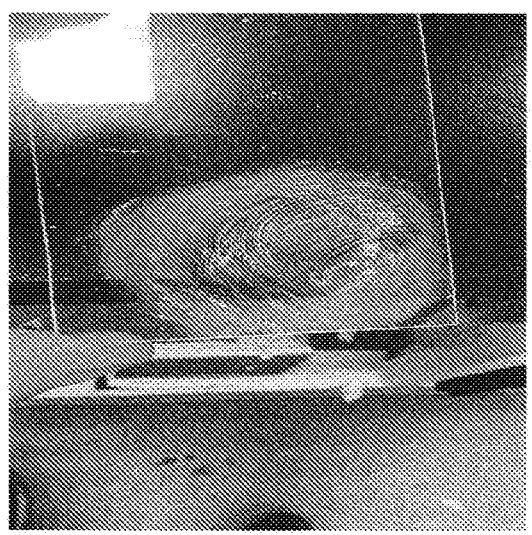
FIG. 8 is a photograph of a solvent evaluation on a clear polycarbonate sheet.

FIG. 8 is a photograph of a solvent evaluation of a mixture of about 74% wt. dimethyl carbonate and about 26% wt. propylene glycol n-propyl ether on a clear polycarbonate sheet, wherein the force applied was 3.3 pounds. Thus, the tested solvent is a mixture of a "first solvent" and a "second solvent" as described herein. The surface of the Control Polycarbonate Substrate has a milky, almost opaque appearance, indicating that the solvent mixture aggressively softens a Control Polycarbonate Substrate, and therefore is not appropriate for use as a polycarbonate headlight lens cleaning composition as described herein.

Figure 9:
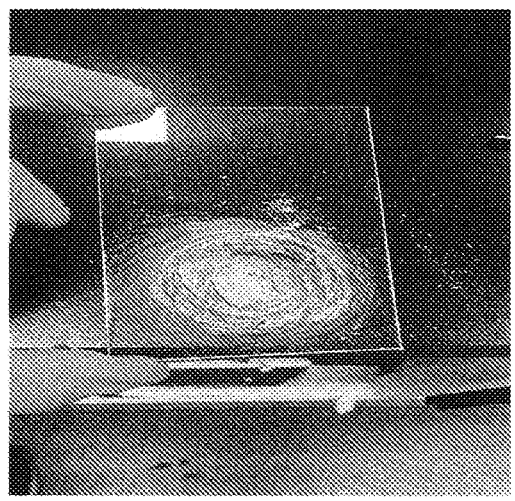
FIG. 9 is a photograph of a solvent evaluation on a clear polycarbonate sheet.

FIG. 9 is a photograph of a solvent evaluation of a mixture of about 81% wt. acetone and about 19% wt. propylene glycol n-propyl ether on a clear polycarbonate sheet, wherein the force applied was 3.3 pounds. Thus, the tested solvent is a mixture of a "first solvent" and a "second solvent" as described herein. The surface of the Control Polycarbonate Substrate has a milky, almost opaque appearance, indicating that the solvent mixture aggressively softens a Control Polycarbonate Substrate, and therefore is not appropriate for use as a polycarbonate headlight lens cleaning composition as described herein.

Example 1

A cleaning composition was prepared by mixing acetone (55.55 wt %) and propylene glycol n-propyl ether (44.45 wt %).

A restoring composition (i.e., clear coat) was prepared by mixing hexyl alcohol (51.33 wt %), a silicone resin (i.e., Dow CorningRSN-0217 flake resin) (13.67 wt %), and diethylene glycol monobutyl ether (35 wt %).

To remove oxidation and contaminants from a headlight, the cleaning composition was loaded onto a pulp based wipe, preferably at 1:2 to 1:3 wipe to cleaning composition. The wipe was folded twice or thrice, and the surface of the headlight was wiped back and forth in a desired direction (preferably horizontal) with firm even pressure.

As soon as resistance was felt while applying the cleaning composition, a cleaner side of the wipe was switched to and continued wiping with firm even pressure back and forth. The process was continued until no more grime or yellowing was seen on the wipe. As acetone is a fast evaporating solvent, working on smaller sections of the headlight lens with multiple preloaded pulp based wipe, while constantly turning over to the cleaner side of the wipe was the desired method of application.

To restore the clear coat and prevent the headlight from further oxidation, the restoring composition was applied onto cotton based wipe, preferably at 1:1.5 to 1:2 cotton wipe to restoring composition. The surface of the headlight was gently coated evenly from top to bottom, again working on smaller sections preferably. As the solvents used in the restoring composition are slow evaporating, it is preferred to give a drying time of 6 hours after the coating has been applied, depending on the temperature, humidity, weather, and the like.

Example 2

A cleaning composition was prepared by mixing dimethyl carbonate (about 37 wt %) and propylene glycol n-propyl ether (about 63 wt %).

A restoring composition (i.e., clear coat) was prepared by mixing hexyl alcohol (51.33 wt %), a silicone resin (i.e., Dow CorningRSN-0217 flake resin) (13.67 wt %), and diethylene glycol monobutyl ether (35 wt %).

To remove oxidation and contaminants from a headlight, the cleaning composition was loaded onto a pulp based wipe, preferably at 1:2 to 1:3 by weight wipe to cleaning composition. The wipe was folded twice or thrice, and the surface of the headlight was wiped back and forth in a desired direction (preferably horizontal) with firm even pressure.

As soon as resistance was felt while applying the cleaning composition, a cleaner side of the wipe was switched to and continued wiping with firm even pressure back and forth. The process was continued until no more grime or yellowing was seen on the wipe.

To restore the clear coat and prevent the headlight from further oxidation, the restoring composition was applied onto cotton based wipe at a weight ratio of about 1:4 cotton wipe to restoring composition. The surface of the headlight was gently coated evenly from top to bottom, again working on smaller sections preferably. As the solvents used in the restoring composition are slow evaporating, it is preferred to give a drying time of 6 hours after the coating has been applied, depending on the temperature, humidity, weather, and the like.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A polycarbonate headlight lens cleaning and restoring kit consisting of:
   a) a polycarbonate headlight lens cleaning composition that contains only liquid components, consisting of:
      i) a first solvent that softens a Control Polycarbonate Substrate, the first solvent having a flash point of from −58° F. to 220° F.; and
      ii) a second solvent that does not soften the Control Polycarbonate Substrate, the second solvent being miscible with the first solvent at a temperature of 25° C. at 1 atm,
   wherein the first solvent and the second solvent are present in an amount to remove discoloring contaminants from a polycarbonate headlight lens;
   b) an applicator wipe; and
   c) a polycarbonate headlight lens restoring composition consists of a silicone resin in an amount from about 5 weight percent to about 25 weight percent of the restoring composition, hexyl alcohol in an amount from about 30 weight percent to about 60 weight percent of the restoring composition, and diethylene glycol monobutyl ether in an amount from about 30 weight percent to about 60 weight percent of the restoring composition.

2. The polycarbonate headlight lens cleaning and restoring kit of claim 1, wherein the first solvent has a flash point of from −58° F. to 90° F.

3. The polycarbonate headlight lens cleaning and restoring kit of claim 1, wherein the first solvent is selected from the group consisting of acrylonitrile; alkyl aldehydes; alkyl actetates; aryl aldehydes; alkyl ethers; alkyl esters; ammonium hydroxide; benzyl alcohol; alkyl phthalates; Chloroethane; cycloalkanes; dialkyl carbonates; dichloroethane; 1,4 dioxane; hydrotreated isoparaffins and naphthenics; hydroxyl alkyl ketones; kerosene; ketones; methylene chloride; nitrobenzene; phenol; tetrahydrofuran; turpentine; xylene; and mixtures thereof.

4. The polycarbonate headlight lens cleaning and restoring kit of claim 1, wherein the first solvent is selected from the group consisting of acetaldehyde; acetone, benzaldehyde; butyl phthalate, cyclohexane, cyclohexanone, cyclopentanone; diethyl ether; dimethoxymethane; dimethyl carbonate; ethyl acetate; 4-hydroxy-4-methylpentan-2-one; isopropyl acetate; methyl ethyl ketone; methyl isopropyl ketone; propyl acetate; 1,2-xylene; and mixtures thereof.

5. The polycarbonate headlight lens cleaning and restoring kit claim 1, wherein the second solvent is selected from the group consisting of glycol ethers, C1-C8 alkyl alcohols, and mixtures thereof.

6. The polycarbonate headlight lens cleaning and restoring kit of claim 1, wherein the second solvent is selected from the group consisting of propylene glycol n-propyl ether, propylene glycol n-butyl ether, diethylene glycol monobutyl ether, and mixtures thereof.

7. The polycarbonate headlight lens cleaning and restoring kit of claim 6, wherein the second solvent is propylene glycol n-propyl ether.

8. The polycarbonate headlight lens cleaning and restoring kit of claim 1, wherein the second solvent is selected from the group consisting of glycol ether solvents with an alkylene functionality selected from ethylene, diethylene, triethylene, propylene, dipropylene or tripropylene glycols with methyl, ethyl, propyl, butyl, pentyl, or hexyl ether groups, and mixtures thereof.

9. The polycarbonate headlight lens cleaning and restoring kit of claim 1, wherein the second solvent is selected from the group consisting of 2-butoxyethanol, diethylene glycol butyl ether, triethylene glycol methyl ether, propylene glycol methyl ether, dipropylene glycol methyl ether, propylene glycol propyl ether, propylene glycol butyl ether, dipropylene glycol butyl ether, tripropylene glycol butyl ether, and mixtures thereof.

10. The polycarbonate headlight lens cleaning and restoring kit of claim 1, wherein the first solvent is dimethyl carbonate and the second solvent is selected from propylene glycol n-propyl ether, propylene glycol n-butyl ether, diethylene glycol monobutyl ether, and mixtures thereof.

11. The polycarbonate headlight lens cleaning and restoring kit of claim 1, wherein the first solvent is present at a level of from about 15% to about 60%.

12. The polycarbonate headlight lens cleaning and restoring kit of claim 1, wherein the second solvent is present at a level of from about 30% to about 85%.

13. The polycarbonate headlight lens restoring kit of claim 1, wherein the silicone resin is a hydroxyl-functional phenyl silicone resin.

14. A method of cleaning and restoring a polycarbonate headlight lens, the polycarbonate headlight lens being at least partially discolored from discoloring contaminants, the method consisting of:
  a) providing a polycarbonate headlight lens cleaning composition consisting of:
    i) a first solvent that softens a Control Polycarbonate Substrate, the first solvent having a flash point of from −58° F. to 220° F.; and
    ii) a second solvent that does not soften the Control Polycarbonate Substrate, the second solvent being miscible with the first solvent at a temperature of 25° C. at 1 atm,
  wherein the first solvent and the second solvent are present in an amount to remove discoloring contaminants from a polycarbonate headlight lens;
  b) applying the polycarbonate headlight lens cleaning composition onto a discolored polycarbonate headlight lens surface;
  c) removing discoloring contaminants from the polycarbonate headlight surface to provide a cleaned polycarbonate headlight lens; and
  d) subsequently applying a polycarbonate headlight lens restoring composition onto the cleaned polycarbonate headlight lens, wherein the lens restoring composition consists of a silicone resin in an amount from about 5 weight percent to about 25 weight percent of the restoring composition, hexyl alcohol in an amount from about 30 weight percent to about 60 weight percent of the restoring composition, and diethylene glycol monobutyl ether in an amount from about 30 weight percent to about 60 weight percent of the restoring composition.

15. The method of claim 14 wherein the applicator wipe is selected from the group consisting of a wipe, woven fabric, non-woven fabric, sponge, towelette, pad and/or combination thereof.

* * * * *